United States Patent
Henson et al.

(10) Patent No.: US 6,950,518 B2
(45) Date of Patent: Sep. 27, 2005

(54) DATA ENCRYPTION SYSTEM

(75) Inventors: Kevin M. Henson, Garland, TX (US); Eric Myron Smith, Farmersville, TX (US)

(73) Assignee: Asier Technology Corporation, Plano, TX (US)

( * ) Notice: Subject to any disclaimer, the term of this patent is extended or adjusted under 35 U.S.C. 154(b) by 885 days.

(21) Appl. No.: 09/797,272

(22) Filed: Mar. 1, 2001

(65) Prior Publication Data

US 2002/0131591 A1 Sep. 19, 2002

Related U.S. Application Data

(60) Provisional application No. 60/266,400, filed on Feb. 2, 2001.

(51) Int. Cl.[7] .............................................. G06F 17/00
(52) U.S. Cl. ......................... 380/44; 380/46; 380/267; 380/268
(58) Field of Search .................. 380/44–47, 267–269; 713/168–171

(56) References Cited

U.S. PATENT DOCUMENTS 5,245,658 A   9/1993   Bush et al.

OTHER PUBLICATIONS http://www.quantdec.com/encryption.htm.*
Mellen, G. E. "Cryptology, computers, and common sense" AFIPS Conference Proceedings, National Computer Composition and Exposition, New York, NY, vol. 42, 1973 Jun. 4–8, 1973.
Schneier, Bruce; "Applied Cryptography Second Edition" 1996, John Wiley & Sons, Inc. USA XP002268639, p. 10–p. 12, p. 193–p. 196.

* cited by examiner

*Primary Examiner*—David Jung
(74) *Attorney, Agent, or Firm*—Jackson Walker LLP; Robert C. Klinger

(57) ABSTRACT

A system (100) and method (400, 500) for data encryption and decryption are disclosed. The encryption system is operable at encryption rates in excess of 10 Mbps and is expandable to over 200 Mpbs. For encryption, plain characters are received, and a key block (120) includes key characters corresponding to the plain characters is accessed. A current key character corresponding to a current plain character is located. A next key character corresponding to a next plain character is located. An offset between the current key character and the next key character is determined to encrypt the plain characters. Aliases are used to facilitate the encryption and decryption. Vector distances of offsets are utilized for the encryption and decryption, using many variables and many dimensions, such as using coordinates.

55 Claims, 6 Drawing Sheets

*FIG. 2*

KEY BLOCK 120

*FIG. 3a*

ALIAS TABLES 124

FIG. 3b  STARTING ALIAS TABLES 172

X-STARTING ALIAS 172a

| x = | -20 | ... | 0 | ... | 20 |
|---|---|---|---|---|---|
| | P | ... | L | ... | J |

320a

Y-STARTING ALIAS 172b

| y = | -20 | ... | 0 | ... | 20 |
|---|---|---|---|---|---|
| | N | ... | 8 | ... | B |

320b

Z-STARTING ALIAS 172c

| y = | -20 | ... | 0 | ... | 20 |
|---|---|---|---|---|---|
| | 5 | ... | R | ... | Q |

320c

FIG. 3c  De-ALIAS TABLES 125

X-De-ALIAS TABLE 125a

| ASCII: | 0 | 33 | 49 | 51 | 54 | 56 57 | 63 | 71 | 74 | 78 | 82 | 87 | 97 98 99 | 101 | 104 |
|---|---|---|---|---|---|---|---|---|---|---|---|---|---|---|---|
| x = | null | ! | 1 | 3 | 6 | 8 9 | ? | G | J | N | R | W | a b c | e | h |
| | | -3 | ... | 4 | -3 | 3 -20 | 2 | 4 | -20 | 2 | 2 | -20 | 4 -3 20 | -20 | 20 |

Y-De-ALIAS TABLE 125b

| ASCII: | 0 | 37 | 48 | 50 | 64 65 | 70 | 78 | 85 | 87 | 97 | 107 | 115 116 |
|---|---|---|---|---|---|---|---|---|---|---|---|---|
| y = | null | % | 0 | 2 | @ A | F | N | U | W | a | k | s t |
| | | 20 | -20 | 1 | 1 0 | 0 | 3 | 0 | -20 | 20 | 20 | 1 3 |

Z-De-ALIAS TABLE 125c

| ASCII: | 0 | 52 53 | 55 | 73 | 79 | 82 | 84 | 86 | 90 | 102 | 107 | 109 |
|---|---|---|---|---|---|---|---|---|---|---|---|---|
| z = | null | 4 5 | 7 | I | O | R | T | V | Z | f | k | m |
| | | 0 -20 | -20 | 20 | -20 | 0 | 1 | 1 | 20 | 0 | 1 | 20 |

DATA ENCRYPTION SYSTEM

This application claims the benefit of Provisional application Ser. No. 60/266,400, filed Feb. 2, 2001.

TECHNICAL FIELD OF THE INVENTION

This invention relates generally to the field of information handling, and more specifically to a method and system for data encryption and decryption.

BACKGROUND OF THE INVENTION

The security of information poses challenges for businesses and other organizations that transmit and store information. Data encryption is intended to transform data into a form readable only by authorized users. One encryption method encrypts data represented by a number by multiplying the number by a large prime number to form a product. To decrypt the data, the product must be divided by the original prime number, which is known only to authorized users. Without knowledge of the prime number, the factoring to determine the prime number uses large amounts of processing power and time.

Data encrypted using prime numbers, however, may be readily decrypted by an unintended, unauthorized user, given enough processing power and time. Moreover, encrypting and decrypting data using large prime numbers slows the speed of data transmission such that these methods of encryption may not be feasible for real-time audio and video encryption. In cryptography, there is typically a compromise between processing speed and the degree of information security.

Another encryption method described in U.S. Pat. No. 5,245,658 to Bush et al. encrypts data by first selecting a domain of characters, where each character is associated with a coordinate. Characters are encrypted using the coordinates of the characters. The domain may be switched during encryption of the characters. The teachings of this patent are incorporated herein by reference.

Unauthorized users, however, may eventually decrypt data encrypted using a domain-based encryption method by performing a statistical analysis on the encrypted data. Coordinates that appear frequently in the encrypted data may be associated with characters that appear frequently in the language of the decrypted characters. If a sufficient amount of encrypted data is analyzed, the data may be decrypted. Consequently, encrypting data with a high degree of security and fast processing speed has posed challenges.

SUMMARY OF THE INVENTION

The present invention achieves technical advantages as a multidimensional encryption system and method utilizing relative vector offsets, concealed within poly-alphabetic alias substitutions and a multi-level nested hierarchical key block. By utilizing coordinate geometry, this invention achieves superior encryption security and processing speed.

According to one embodiment of the present invention, a method for data encryption is disclosed. Plain characters are received, and a key block that includes key characters corresponding to the plain characters is accessed. The following are repeated for subsequent plain characters to encrypt the plain characters: a current key character corresponding to a current plain character is located, a next key character corresponding to a next plain character is located, and an offset between the current key character and the next key character is determined. An alias is used to obscure the meaning of the offset.

According to one embodiment of the present invention, a system for data encryption is disclosed that includes an input that receives plain characters. A memory stores a key block that includes key characters corresponding to the plain characters. A processor repeats the following for subsequent plain characters: locate a current key character corresponding to a current plain character and locate a next key character corresponding to a next plain character. An offset module repeats the following for each plain character to encrypt the plain characters: determines an offset between the current key character and the next key character, and obscures the meaning of the offset with an alias from a set of aliases. An output transmits the encrypted plain characters.

According to one embodiment of the present invention, a method for data decryption is disclosed. Encrypted data associated with plain characters is received. The encrypted data includes aliases. A de-alias table is accessed to convert the alias characters into offsets. A key block that includes key characters corresponding to the plain characters is accessed. The following is repeated for each alias to decrypt the encrypted data: an offset is determined from an alias, a current key character is located, a next key character corresponding to the offset applied to the current key character is located, and a plain character corresponding to the next key character is determined.

According to one embodiment of the present invention, a system for data decryption is disclosed. An input receives encrypted data associated with plain characters. The encrypted data includes aliases. A memory stores a key block that includes key characters corresponding to the plain characters. A processor repeats the following for each alias to decrypt the encrypted data: determines an offset from an alias, locates a current key character, locates a next key character corresponding to the offset applied to the current key character, and determines a plain character corresponding to the next key character. An output transmits the decrypted data.

Embodiments of the invention provide numerous technical advantages. A technical advantage of one embodiment is that relative offsets between key characters corresponding to plain characters are used to encrypt a message. By using relative offsets, the encryption of a message results in a different output each time the message is encrypted, thus improving security without substantial use of processing power or time. Another technical advantage of one embodiment is that a different starting key character may be used to encrypt each message. Changing the starting key character results in different encrypted characters, even when the same message is encrypted multiple times.

Another technical advantage of one embodiment is that a key block has a header block for encrypting the header of a message and a separate access block for encrypting the body of a message. Accordingly, if an unauthorized user decrypts only the header of a message, the unauthorized user using this decrypted information cannot decrypt the body of the message.

Another technical advantage of one embodiment is that alias tables may be used. Aliases, which reside in tables, are used to obscure the meaning of offsets. Many aliases may be associated with a given offset so that it is poly-alphabetical.

Another technical advantage of one embodiment is that multiple alias tables may be created so that a permutation of alias tables can take place according to a random and dynamic schedule. By permuting the alias tables at an unknown schedule, the collecting of data for frequency analysis of aliased offsets is not useful.

Another technical advantage of one embodiment is that a key block may have access blocks that allow for selective and even hierarchical access to encrypted data. Access blocks may include subsets of other access blocks, and may intersect with other access blocks. Another technical advantage of one embodiment is that data may be compressed prior to encryption to further obscure the text. Accordingly, embodiments of the present invention further provide for secure data encryption without substantial use of processing power or time.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 illustrates one embodiment of a key block that may be used with the system of FIG. 1;

FIGS. 3A–3C illustrate one embodiment of alias tables, de-alias tables, and starting alias tables that may be used with the system of FIG. 1;

DETAILED DESCRIPTION OF THE PREFERRED EMBODIMENTS AND BEST MODE

Embodiments of the present invention and its advantages are best understood by referring to FIGS. 1 through 6 of the drawings, like numerals being used for like and corresponding parts of the various drawings.

Figure 1:
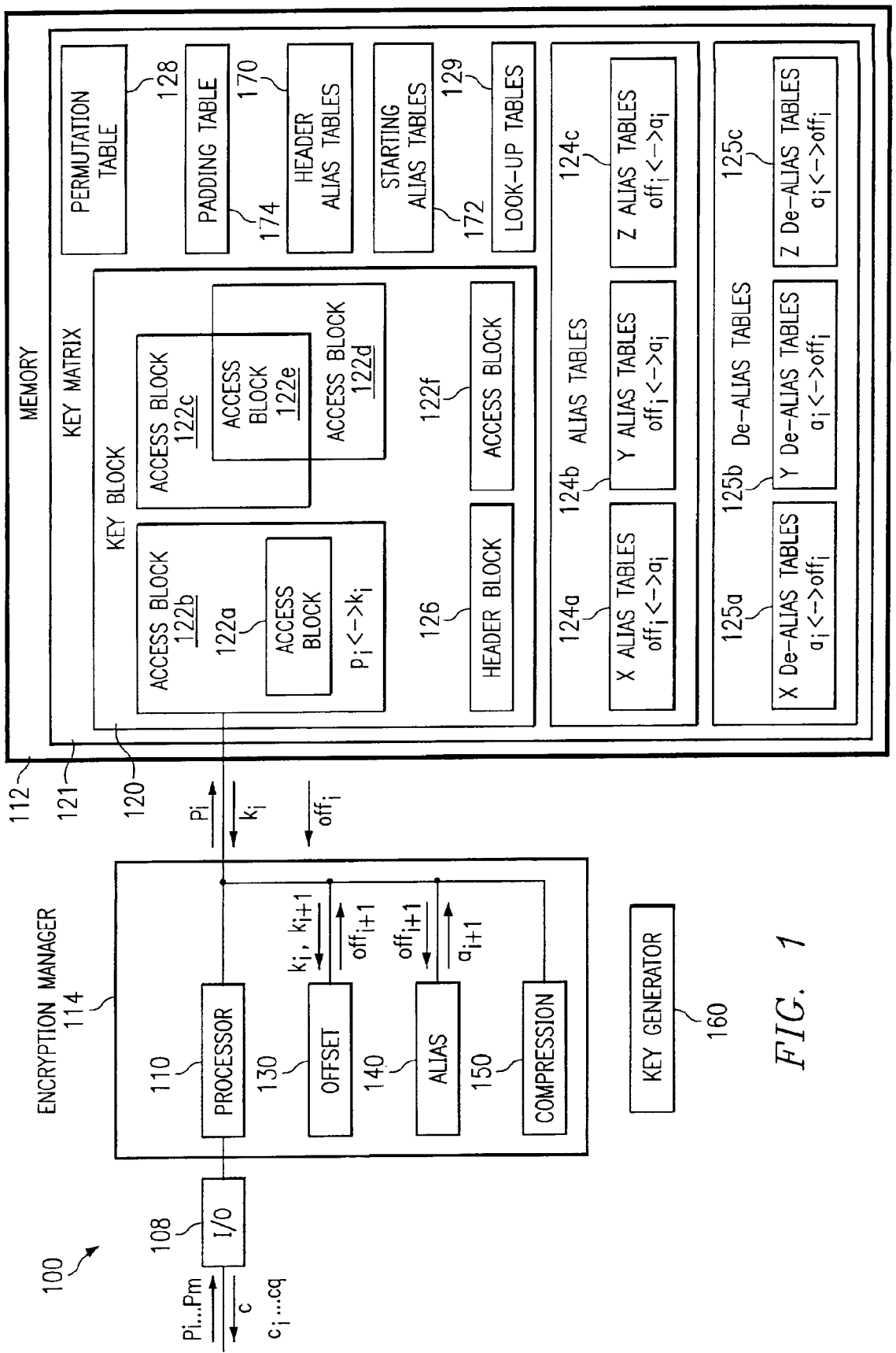
FIG. 1 illustrates one embodiment of a system for encrypting and decrypting data according to the present invention.

FIG. 1 illustrates one preferred embodiment of the system, shown as system 100 for encrypting and decrypting data according to the present invention. System 100 encrypts a sequence of plain characters by locating the plain characters in a block of key characters comprising a key block 120 of a key matrix 121, determining relative offsets between the key characters, and then associating an alias with each offset parameter.

In the illustrated embodiment, the plain characters include the American Standard Code for Information Interchange (ASCII) character set, which comprises characters represented by eight bit bytes. While for the sake of brevity and clarity the data being encrypted is described as plain text illustrated as ASCII characters, it is within the scope of this invention that plain text characters, may be alternatively data bytes such as EBCDIC, ANSI, UNICODE, or ISO10646, representing audio and video such as streaming audio/video data, rich text, application programs, or other suitable data, and limitation to plain text is not to be inferred. The current standard for electronic data is 8 bit bytes. System 100 encrypts and decrypts any electronic data regardless of data type.

System 100 includes an encryption manager module 114 responsive to an input/output (I/O) module 108, a processor 110, an offset module 130, an alias module 140, and a compression module 150. The operations of system 100 may be performed by any combination of software and/or hardware, and any number, combination, or arrangement of processors or modules. Encryption manager 114 includes a processor 110 that manages the process of encrypting a sequence of plain characters $p_1 \ldots p_m$ into encrypted characters $c_1 \ldots c_q$, which alternatively may be data bytes. Processor 110 also manages the process of decrypting encrypted characters $c_1 \ldots c_q$ into plain characters $p_1 \ldots p_m$. Processor 110 may include a digital signal processor or a numeric processor. Input/output module 108 receives and outputs plain characters $p_1 \ldots p_m$ and encrypted characters $c_1 \ldots c_q$.

System 100 also includes a key matrix 121, which may be stored in a memory 112. Key matrix 121, which may be created by a key generator 160, may include one or more of the following subsets: key blocks 120, access blocks 122, header blocks 126, look-up tables 129, alias tables 124, de-alias tables 125, header alias tables 170, starting alias tables 172, padding tables 174, and permutation tables 128. Access blocks as shown in 122a, 122b, 122c, 122d, and 122e are n-dimensional arrays, randomly populated. The individual elements of key block 120 are referred to as key characters. Key block 120 is described in more detail in connection with FIG. 2.

Figures 2, 3A:
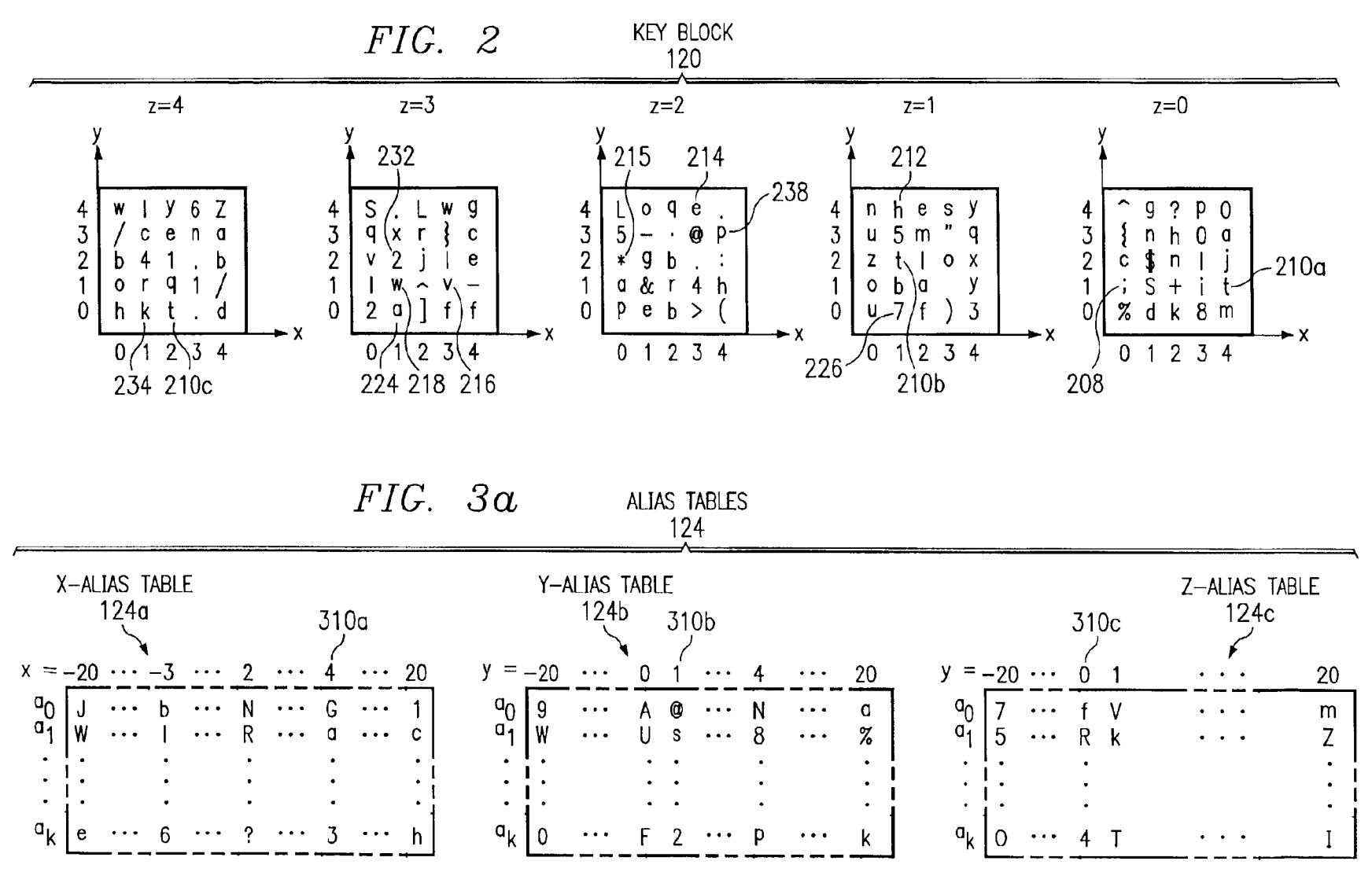

FIG. 2 illustrates one embodiment of a key block 120 that may be used with system 100 of FIG. 1. Key block 120 is represented by a randomly populated three-dimensional structure (n=3) that includes a plurality of key characters $k_i$ that correspond to plain characters $p_i$. Each plain character $p_i$ corresponds to at least one key character $k_i$. Each key character is located at a point of key block 120 represented by a coordinate (x,y,z), where the coordinate has n-variables, in this illustration n being 3. Key characters may include, for example, ASCII characters, or any suitable data type. Key block 120 may be loaded or saved in any suitable manner. For example, key block 120 may be placed in memory 112 on a removable physical medium such as CD-ROM, floppy disk, hard disk, flash memory card, or other medium.

In one embodiment, key character $k_i$ is identical to its corresponding plain character $p_i$, for example, key characters "t," "h," and "e" correspond to plain characters "t," "h," and "e," respectively, of the sequence "the." Key character $k_i$, however, need not be identical to its corresponding plain character $p_i$. Additionally, multiple key characters $k_i$ of key block 120 correspond to a single plain character $p_i$. For example, multiple key characters "t" shown at 210a, 210b, and 210c, correspond to plain character "t."

An offset describes a functional relationship between coordinates of two key characters. For example, for coordinates $(x_1,y_1,z_1)$ and $(x_2,y_2,z_2)$ of two key characters, functions $fx(x_1,x_2)=fx$, $fy(y_1,y_2)=fy$, and $fz(z_1,z_2)=fz$ may be used to describe an offset expressed by the ordered set <fx,fy,fz>. Function $fx(x_1,x_2)$ may be such that given inputs $x_1$ and $x_2$, a unique output fx may be determined. Accordingly, given input $x_1$ and output fx, input $x_2$ may be determined. Functions $fy(y_1,y_2)$ and $fz(z_1,z_2)$ may be similarly constructed.

In one embodiment, the offset describes the relative dimensional displacement between two key characters. An offset may be expressed as a displacement vector represented by an ordered set <x,y,z> of offset parameters x, y, and z, where each offset parameter represents a displacement along a coordinate axis. For example, the offset parameter in the x direction from key character "%" 208 at coordinate (0,0,0) to key character "t" 210*a* is +4, the offset parameter in the y direction is +1, and the offset parameter in the z direction is 0, that is, the offset is <4,1,0>.

In one embodiment, the displacement vector can be the result of modulus arithmetic applied to a dimensional axis performed by processor 110. For example, moving in the positive direction, if the boundary on the x side of the xy plane is exceeded, then proceed to $(x_1+x_2)$ modulus dimension limit. For instance, starting from character "v" 216 at coordinate (3,1,3), a displacement of +3 units in the x direction exits the positive x side boundary, enters the negative x side boundary of the xy plane at x=0, and terminates at character "w" 218 (3+3) modulus 5=1 at coordinate (1,1,3). This is referred to as wrapping about an axis. If the boundary on the y side of the xy plane is exceeded, then proceed to $(y_1+y_2)$ modulus dimension limit. For instance, starting from character "w" 218 at coordinate (1,1,3), a displacement of +4 units in the y direction exits the positive y side boundary, enters the negative y side boundary of the xy plane at y=0, and terminates at (1+4) modulus 5=0 at coordinate (1,0,3) character "a" 224. If the boundary on the z side of the yz plane is exceeded, then proceed to $(z_1+Z_2)$ modulus dimension limit. For instance, starting from character "a" 224 at coordinate (1,0,3), a displacement of +3 units in the z direction exits the positive z side boundary, enters the negative z side boundary of the yz plane at z=0, and terminates at (3+3) modulus 5=1 at coordinate (1,0,1) being corresponding character "7" 226. Thus, starting from character "v" 216 at coordinate (3,1,3), a displacement of <3,4,3> results in a movement to coordinate (1,0,1) being corresponding character "7" 226.

In one embodiment, the displacement vector can be the result of the number of units from one coordinate to the next, performed by processor 110. For example, moving in the positive direction, if the boundary on the x side of the xy plane is exceeded, then the algorithm must move up 1 in the y direction and then proceed to $(x_1+x_2)$ modulus dimension limit. For instance, starting from character "v" 216 at coordinate (3,1,3), a displacement of +3 units in the x direction exits the positive x side, moves up 1 in the y direction to y=2, enters the negative x side of the xy plane at x=0, and terminates at (3+3) modulus 5=1 at coordinate (1,2,3) character "2" 232. A distance of 3 units. If the boundary on the y side of the xy plane is exceeded, then the algorithm must add 1 in the z direction and proceed to $(y_1+y_2)$ modulus dimension limit. For instance, starting from character "2" 232 at coordinate (1,2,3), a displacement of +3 units in the y direction exits the positive y side, moves up 1 in the z direction to z=4, enters the negative y side of the xy plane at y=0, and terminates at (2+3) modulus 5=0 at coordinate (1,0,4) character "k," 234. A distance of 15 units. If the boundary on the z side of the yz plane is exceeded, then the algorithm proceeds to $(z_1+z_2)$ modulus dimension limit. For example, starting from character "k" 234 at coordinate (1,0,4), a displacement of +2 units in the z direction exits the positive z side, enters the negative z side of the yz plane at z=0, and terminates at (4+2) modulus 5=1 at coordinate (1,0,1) character "7" 226. A distance of 50 units. Thus, starting from character "v" 216 at coordinate (3,1,3), a displacement of <3,3,2> results in a movement to coordinate (1,0,1) character "7" 226, or, in terms of units, there are 68 units from coordinate (3,1,3) to coordinate (1,0,1). The offset <3,3,2>=(x*1)+(y*5)+(z*25)=68 units.

The displacement vector may also be expressed as a direction and a magnitude. For example, the offset from plain character "%" 208 at coordinate (0,0,0) to plain character "t" 210*a* may be described as displacement of a magnitude of:

$$\sqrt{\Delta x^2+\Delta y^2+\Delta z^2}=\sqrt{(4-0)^2+(1-0)^2+(0-0)^2}=\sqrt{17}$$

in the direction represented by:

$$\text{arcsine}\left(\frac{\Delta y}{\sqrt{\Delta x^2+\Delta y^2}}\right)=\text{arcsine}\left(\frac{1}{\sqrt{(4-0)^2+(1-0)^2}}\right)$$

$$=\text{arcsine}\left(\frac{1}{\sqrt{17}}\right)$$

about the z axis, and by:

$$\text{arccosine}\left(\frac{\Delta z}{\sqrt{\Delta x^2+\Delta y^2+\Delta z^2}}\right)=$$

$$\text{arccosine}\left(\frac{0}{\sqrt{(4-0)^2+(1-0)^2+(0-0)^2}}\right)=\text{arccosine}(0)$$

from the z axis.

Although key block 120 has a Euclidean geometry labeled with a Cartesian coordinate system, key block 120 may have any suitable geometry represented by a suitable coordinate system. For example, key block 120 may have a spherical geometry represented by spherical coordinates. Although three dimensions (n=3) are used to illustrate key block 120, key block 120 may have any suitable number of dimensions such as one, two, five or more. In general, more secure encryption is obtained when a larger number of dimensions "n" are used.

Additionally, although each dimension of key block 120 is illustrated as having a length of five units, each dimension of key block 120 may have a length of any suitable number of units, such as 15 or 20 units, or more. Increasing the number of units typically increases the difficulty of deciphering the encrypted message, making the encryption system more secure.

Advantageously, integers are used to label the coordinates, although not required, and thus provide for more efficient electronic processing. Any suitable labels may be used. For example, real numbers may be used as labels for the coordinates. Furthermore, although key block 120 is illustrated as a cube, key block 120 may have any suitable shape, such as spherical, cylindrical, or dodecahedral. Moreover, even though key matrix 121 is illustrated as having one key block 120, key matrix 121 may include any suitable number of key blocks 120 or parts thereof.

Referring back to FIG. 1, key block 120 includes access blocks 122, which are subsets of key block 120. Access blocks 122 are used to define areas of key block 120 to which a user may or may not have a right to use. A user with rights to only a specific access block 122 can encrypt and decrypt only characters associated with that access block 122. For example, a user with rights to use access block 122*a* does not have rights to use encrypted data associated with access block 122*c*.

Access blocks 122 may intersect, to form a geometric union, to provide selective access to users. A volume that is the intersection of access blocks 122*c* and 122*d* is referred to as a union as shown in 122*e*. For example, a user with the right to use access block 122*c* has the right to encrypted data associated with the union 122*e* of access block 122*d*, and a user with the rights to use access block 122*d* has the right to use the encrypted data associated with the union 122*e* of access block 122*c*.

Access blocks 122 may also be organized in hierarchical manner. For example, a user with rights to use access block 122a does not have rights to use encrypted data associated with access block 122b, but a user with rights to use access block 122b may also be permitted rights to use encrypted data associated with access block 122a. Accordingly, system 100 can allow a user to encrypt data that cannot be decrypted by other users of system 100, and can provide selective or hierarchical levels of security for multiple users of system 100. Hierarchical access blocks form a series, or sequence of key blocks nested within each member, element, or set contained in or containing the next in such a mode that lower ranking keys in the hierarchy have progressively less access to data than higher ranking access blocks. For example, an access block (b) that contains a smaller access block (a) within it, such that if a user has access to the larger access block (b), the user also has access to the smaller access block (a). But a user with access to the smaller access block (a) will not have access to the larger access block (b).

Other portions of key block 120 may be designated for specific processing operations. Designating and restricting portions of key block 120 for specific operations allows system 100 to employ a single key block 120 for multiple purposes. For example, a separate header block 126 is used to encrypt and decrypt only the header of a message. By encrypting the body of a message using access blocks 122 and the header of the message using header block 126 separate from access blocks 122, system 100 may provide an additional layer of security. Headers of messages may include data that is repeated in multiple messages, which may allow for easier decryption by an unauthorized user. Advantageously, if an unauthorized user decrypts data encrypted using header block 126, the user still cannot use the header block information to decrypt the body of the message, thus maintaining the security of the body.

Access blocks 122 and header block 126 may be defined by a coordinate representation, for example: $\{(x,y,z): x<q_1, y<q_2, z<q_3\}$ where $q_1$, $q_2$, and $q_3$ are coordinate values for the x, y, and z coordinates. Although access blocks 122 and header block 126 are illustrated as rectangles or cubes, access blocks 122 and header block 126 may be of any suitable shape and may be defined in any suitable manner such as by using a coordinate function. For example, access blocks 122 or header block 126 may have a spherical shape and be defined by:

$$\{(x,y,z): \sqrt{x^2+y^2+z^2} \le r\}$$

where r is a constant. Additionally, key generator 160 may also randomly define access blocks 122 and header block 126 without the knowledge of a user. For example, if, given the constraints that access blocks 122 must be quadrilateral with sides having a length of fifteen to nineteen characters, key generator 160 may randomly select the quadrilateral shape and size to generate access blocks 122.

Look-up tables 129 may be used to associate key characters with their corresponding coordinates. For example, a look-up table 129 may associate key character "t" 210a with coordinate (4,1,0). Processor 110 may use look-up tables 129 to determine the coordinates of a key character using encryption. For example, if processor 110 is encrypting the plain "t," processor 110 may use a look-up table 129 to determine that a coordinate of the key character for "t" 210a is (4,1,0). Use of look-up tables 129 may improve the speed with which processor 110 performs encryption.

The number of rows in look-up table 129 is the result of the total number of common key characters. For example, key block 120 includes three occurrences of key character "t" 210a, 210b, and 210c, located at coordinates (4,1,0), (1,2,1), and (2,0,4), respectively. Row one of look-up table 129 may associate key character "t" 210a with coordinate (4,1,0), row two of look-up table 129 may associate key character "t" 210b with coordinate (1,2,1), and row three of look-up table 129 may associate key character "t" 210c with coordinate (2,0,4).

Look-up tables 129 may use the ASCII number of the key character to store the coordinate of a key character. For example, look-up table 129 may store the coordinate for character "t" using "116," the ASCII number for "t" in position 116 of the table. The use of lookup tables may be used to simplify the process of reserving areas of the key block 120 for specific reasons. For instance, some rows of the lookup tables can be reserved for the header while other rows of lookup tables are reserved for the body.

Alias tables 124, which are described in more detail in connection with FIG. 3, are used by alias module 140 to associate an alias $a_i$ with an offset $Off_i$. Each alias table 124 assigns a set of aliases $\{a_0, a_1, \ldots, a_k\}$ to an offset $Off_i$. Alias module 140 randomly selects one alias $a_i$ of the set to associate with an offset $Off_i$. Different alias tables 124 may be used for different operations to improve security. For example, header alias table 170 may be used to encrypt the header of a message, and starting alias table 172 may be used to encrypt the starting key character of a message. Alias module 140 may use corresponding de-Alias tables 125, which are described in more detail in connection with FIG. 3, to associate an offset $Off_i$ with an alias $a_i$. Each de-alias table 125 matches an alias $a_i$ to its corresponding offset $Off_i$.

Subsets modules 120, 122, 124, 125, 126, 128, 129, 170, 172, 174 of key matrix 121 may be permuted, which may improve the security of the encrypted data. For example, alias tables 124a, 124b, and 124c may be permuted. A permutation table 128 includes permutation commands for permuting alias tables 124a, 124b, and 124c. For example, a command to switch alias tables 124a and 124b, but do not change alias table 124c. These permutation commands may be inserted into the encrypted data in order to direct the decryption of the encrypted data. De-alias tables 125, header alias tables 170, starting alias tables 172, and look-up tables may also be permuted.

Offset module 130 determines the relative offsets between successive key characters $k_i$ and $k_i+1$. The offset may be described as a coordinate offset. For example, referring to FIG. 2, the offset from key character "%" 208 at coordinate (0,0,0) to key character "t" 210a is +4 in the x direction, +1 in the y direction, and 0 in the z direction, that is, the offset is <4,1,0>. The offset between key character "t" 210a and key character "h" 212 is <−3,3,1>, and the offset from key character "h" to key character "e" 214 is <2,0,1>. The resulting offsets are <4,1,0>, <−3,3,1>, and <2,0,1>.

Alias module 140 responsively associates an alias with each determined offset. For example, alias module 140 may associate an alias $a_i$ by assigning an alias component to each offset parameter of offset <4,1,0> using alias tables 124 as described in connection with FIG. 3A.

FIG. 3A illustrates three alias tables 124, where each alias table 124 is used by processor 110 to assign aliases for an offset parameter of the offset. Alias table 124a defines aliases for the x-coordinate of the offset. The set {G,a, ... 3} is defined as aliases that may be associated with offset parameter "4," 310a and alias module 140 selects any member of the set. For example, alias "G," to associate with offset parameter "4." Alias module 140 may select the alias randomly from the associated set. Likewise, alias module 140 uses corresponding alias tables 124b and 124c to associate alias "s" with offset parameter "1," 310*b* and character alias "4" with offset parameter "0," 310*c* respectively, for the y and z offset parameters resulting in alias "Gs4" for offset <4,1,0>.

Additionally, multiple alias tables may be defined for one offset parameter. For instance, 3 or more alias tables may be defined for the x-parameter (x-alias$_0$, x-alias$_1$, x-alias$_2$). Likewise, 3 or more alias tables may be defined for the y-parameter (y-alias$_0$, y-alias$_1$, y-alias$_2$). Similarly, 3 or more alias tables may be defined for the z-parameter (z-alias$_0$, z-alias$_1$, z-alias$_2$). A cycle may be defined to determine which alias tables to use for each offset. This sequential cycle may use x-alias$_0$, y-alias$_0$, z-alias$_0$ for the first offset. For instance, use x-alias$_0$, y-alias$_0$, z-alias$_1$, for the second offset, use x-alias$_0$, y-alias$_0$, z-alias$_2$, and so on. The length of the cycle may be determined by a random variable that instructs the processor 110 to start the cycle over at the beginning. This variable may be aliased and inserted in the encrypted message between cycles. Alias module 140 may associate an alias with a starting key character in a substantially similar manner using starting alias tables 172 as described in connection with FIG. 3B.

FIG. 3B illustrates starting alias tables 172 that associate a starting key character with an alias. Each starting alias table 172 associates an alias to each coordinate of a starting key character. For example, for starting key character "%" 208 at coordinate (0,0,0), in FIG. 2, starting alias table 172*a* associates alias "L" 320*a* with coordinate value "0," starting alias table 172*b* associates alias "8" 320*b* with coordinate value "0," and starting alias table 172*c* associates alias "R" 320*c* with coordinate value "0," resulting in an alias "L8R" for starting key character "%" users n=3 in this example.

Alias tables 124 and 172 may be permuted during encryption. For example, alias tables 124*a* and 124*b* may be permuted such that alias table 124*b* defines aliases for the x-coordinate of the offset and alias table 124*a* defines aliases for the y-coordinate. Alternatively, offset parameters may be permuted after alias module 140 assigns the alias to the offset.

Alias module 140 uses de-alias tables 125 as described in connection with FIG. 3C to determine a corresponding offset from an alias during decryption. FIG. 3C illustrates de-alias tables 125. De-alias tables 125 are used to determine an offset from an alias such as alias "Gs4" encrypted using tables 124*a*, 124*b*, and 124*c*. A de-alias table is an array that holds the non-aliased parameters of the corresponding offset. The number of de-alias tables may equal the number of alias tables. For example, De-alias table 125*a* associates offset parameter "4" with alias "G," de-alias table 125*b* associates offset parameter "1" with alias "s," and de-alias table 125*c* associates offset parameter "0" with alias "4" to translate alias "Gs4" to offset <4,1,0>. The number of de-alias tables 125 may be equivalent to the number of alias tables 124. De-alias tables 125 may use the ASCII number of the alias to store the offset parameter. For example, de-alias table 125*a* may store the offset 4, using "71," the ASCII for "G," in position 71 of the alias table.

Alternatively, alias module 140 may assign an alias $a_i$ to offset <4,1,0> as a whole using, for example, key block 120 of FIG. 2. A starting key character "*" 215 at (0,2,2) is selected. Offset <4,1,0> from starting key character "*" 215 leads to character "p" 238 at (4,3,2), which is assigned to offset <4,1,0>.

A padding table 174 may be used and includes information to determine the amount of padding that an encrypted message includes. If an encrypted message includes padding, processor 110 retrieves the size of the padding from a padding table 174 to determine the beginning of the encrypted data.

A compression module 150 may be used to compress the plain characters prior to encryption. Additionally, compression module 150 may decompress decrypted data. Compression module 150 may use a standard compression program such as PKZIP, and may result in faster encryption.

In summary, system 100 encrypts characters by locating the characters in key block 120, determining an offset between the characters, and assigning an alias to each offset. Key matrix 121 may include one or more of the following subsets: key blocks 120, access blocks 122, header blocks 126, look-up tables 129, alias tables 124, de-alias tables 125, header alias tables 170, starting alias tables 172, padding tables 174, and permutation tables 128 that are used to define levels of right to use encrypted data and to perform other operations of system 100. Decryption is performed using the same principles in the reverse process.

Method of Encryption

Figure 4:
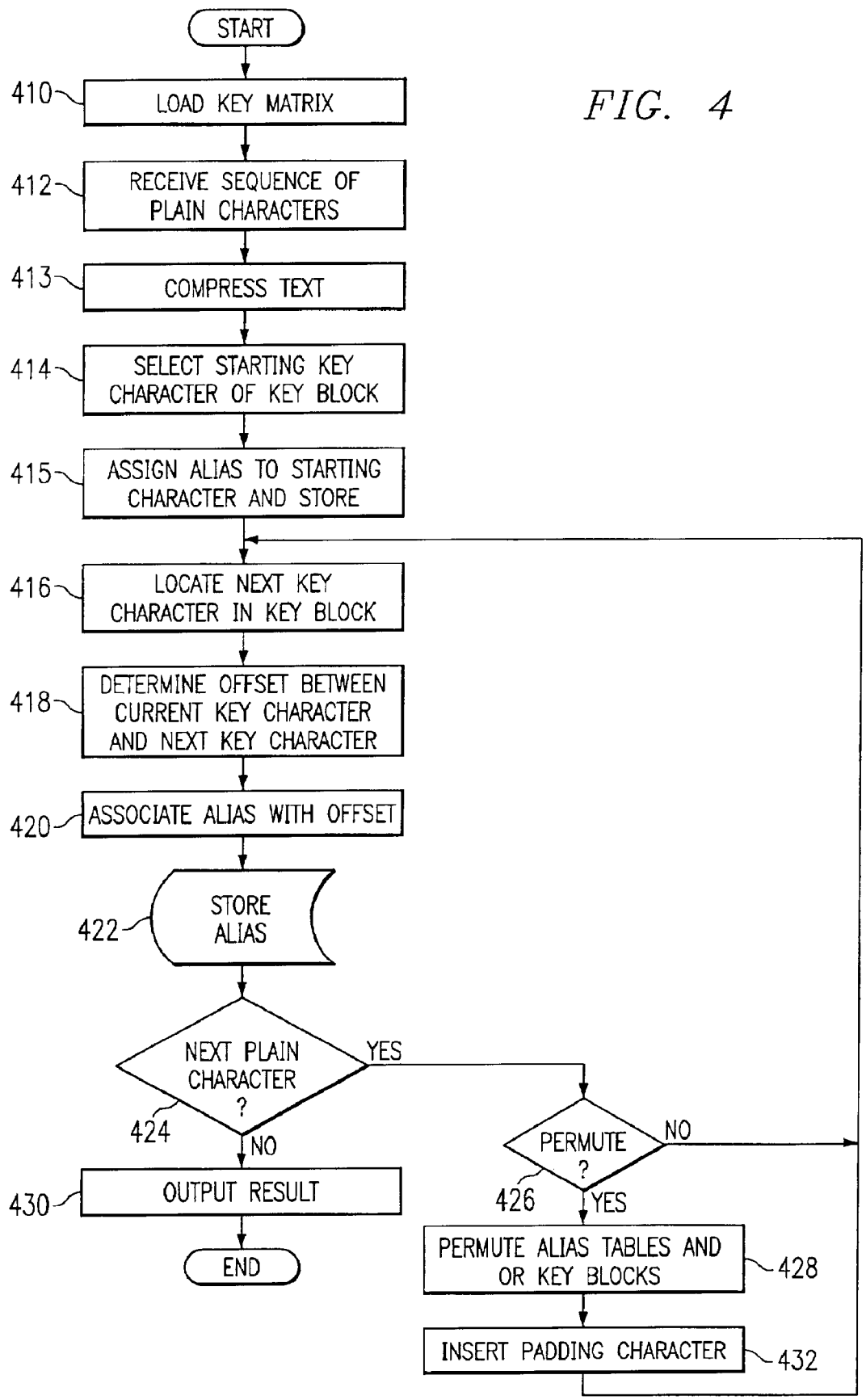
FIG. 4 is a flowchart of one embodiment of a method for encrypting data according to the present invention.

FIG. 4 is a flowchart of one embodiment of a method for encrypting data using system 100 of FIG. 1 according to the present invention. The method begins at step 410, where key matrix 121 is loaded into memory 112 by encryption manager 114 using a key generator 160.

A sequence of plain characters $p_1 \ldots p_m$, for example, the character sequence "the," to be encrypted are received by processor 110 through input/output device 108 at step 412. In one embodiment, compression module 150 compresses the plain characters at step 413.

A starting key character $k_i = k_0$ of key block 120 is selected at random by processor 110 at step 414. For example, key character "%" 208 at coordinate (0,0,0) is selected as starting key character $k_0$, and may be selected randomly.

At step 415, processor 110 assigns an alias to starting key character $k_0$ using starting alias table 172. For example, alias "L8R" is assigned to starting key character "%" 208.

At step 416, a next key character $k_i + 1 = k_1$ is located in key block 120 by processor 110 by selecting a key character $k_1$ corresponding to plain character $p_i + 1 = p_1$. For example, key characters "t" 210*a*, 210*b*, and 210*c* located at coordinates (4,1,0), (1,2,1), and (2,0,4), respectively, correspond to plain character "t." The key character "t" located at (4,1,0) 210*a* is randomly selected from the three key character "t"s 210*a*, 210*b*, and 210*c*; however, any key character $k_i + 1$ corresponding to plain character $p_i + 1$ may be selected in any suitable manner.

The offset between current key character $k_i = k_0$ and next key character $k_i + 1 = k_1$ is determined at step 418 by offset module 130. For example, the offset between starting key character "%" 208 at coordinate (0,0,0) and the next key character "t" 210*a* at coordinate (4,1,0) is <4,1,0>.

An alias $a_i = a_1$ is then associated with this offset by alias module 140 at step 420. The alias may be randomly selected from a set of predefined aliases corresponding to this associated offset. Alias module 140 may associate an alias to the offset by assigning an alias component to each value of the offset using alias tables 124 of FIG. 3, such as alias "G" 310*a* for offset parameter 4, alias "s" 310*b* for offset parameter "1," and alias "4" 310*c* for offset parameter "0," resulting in alias "Gs4" for offset <4,1,0>.

The alias is stored in memory 112 at step 422.

If there is a next plain character $p_i + 1 = p_2$ at step 424, such as plain character "h," the method proceeds to step 426 to determine whether a permutation is to be performed. Subset modules 120, 122, 124, 125, 126, 128, 129, 170, 172, 174 of key matrix 121 may be permuted. For example, alias tables 124*a*, 124*b*, and 124*c* may be permuted such that alias table 124a defines aliases for the y-coordinate, alias table 124b defines aliases for the x-coordinate, and alias table 124c defines aliases for the z-coordinate, where n=3 in this example. Multiple alias tables 124 for a specific offset parameter may also be permuted. The characters of an output may also be permuted. Multiple key blocks 120 may also be permuted. For example, the offset may be a displacement from one key block 120 to another key block 120.

If a permutation is to be performed, the method moves to step 428 to perform the permutation. A permutation command from permutation table 128 describing the permutation may be placed in the encrypted text. After performing the permutation, the method returns to step 416. If a permutation is not to be performed, the method returns to step 416.

Continuing with encrypting plain character "h" of sequence "the" at step 416, a next key character $k_i+1=k_2$ corresponding to plain character $p_i+1$ is located in key block 120. Key character "h" 212 at coordinate (1,4,1) corresponding to plain character "h" is selected by processor 110. The offset between current key character $k_i$ and a next key character $k_i+1$ is determined at step 418 by offset module 130. The offset between current key character "t" at coordinate (4,1,0) and next key character "h" at coordinate (1,4,1) is <−3,3,1>. An alias is associated with this offset at step 420. Alias module 140 associates alias "b" with offset parameter "−3," alias "8" with offset parameter "3," and alias "T" with offset parameter "1" using alias tables 124a, 124b, and 124c, respectively, resulting in alias "b8T" for offset <−3,3,1>. The selected alias is stored at step 422.

If there is a next plain character $p_i+1=p_2$ at step 424, such as plain character "e" of sequence "the," the method proceeds to step 426 to determine whether alias tables 124, 170, or 172 are to be permuted. If a permutation is to be performed, the method moves to step 428 to perform the permutation. A permutation command from permutation table 128 describing the permutation may be placed in the encrypted text. After performing the permutation, the method returns to step 416. If a permutation is not to be performed, the method returns to step 416.

Continuing with encrypting plain character "e" of sequence "the" at step 416, a next key character $k_i+1=k_3$ corresponding to plain character $p_i+1$ is located in key block 120. Key character "e" 214 at coordinate (3,4,2) corresponding to plain character "e" is selected by processor 110. The offset between current key character $k_i$ and a next key character $k_i+1$ is determined at step 418. The offset between current key character "h" at coordinate (1,4,1) and next key character "e" at coordinate (3,4,2) is offset <2,0,1>. An alias is associated with this offset at step 420. Alias module 140 associates alias "?Ak" with offset <2,0,1> using alias tables 124a, 124b, and 124c, respectively. The selected alias is stored at step 422.

If there is no next plain character $p_i+1$ at step 424, such as in this example, the method proceeds to step 430, where a predetermined character is inserted to signify the end of the encrypted data, such as "Null," and the results are output through input/output 108. The resulting output of "L8RGs4b8T?Ak," is the encrypted form of input "the."

Padding, such as random characters, may be inserted before, among or after the encrypted data in order to conceal the beginning of the encrypted text. The size of the padding, such as the number of random characters, may be stored in padding table 174. The insertion of padding may increase the security of the encrypted data because the beginning of the encrypted data needs to be determined in order to decrypt the encrypted data.

After outputting the results, the method terminates. The steps of the method for encrypting data may be performed in a different order. For example, the method may output an alias as soon as it is determined.

Method of Decryption

Figure 5:
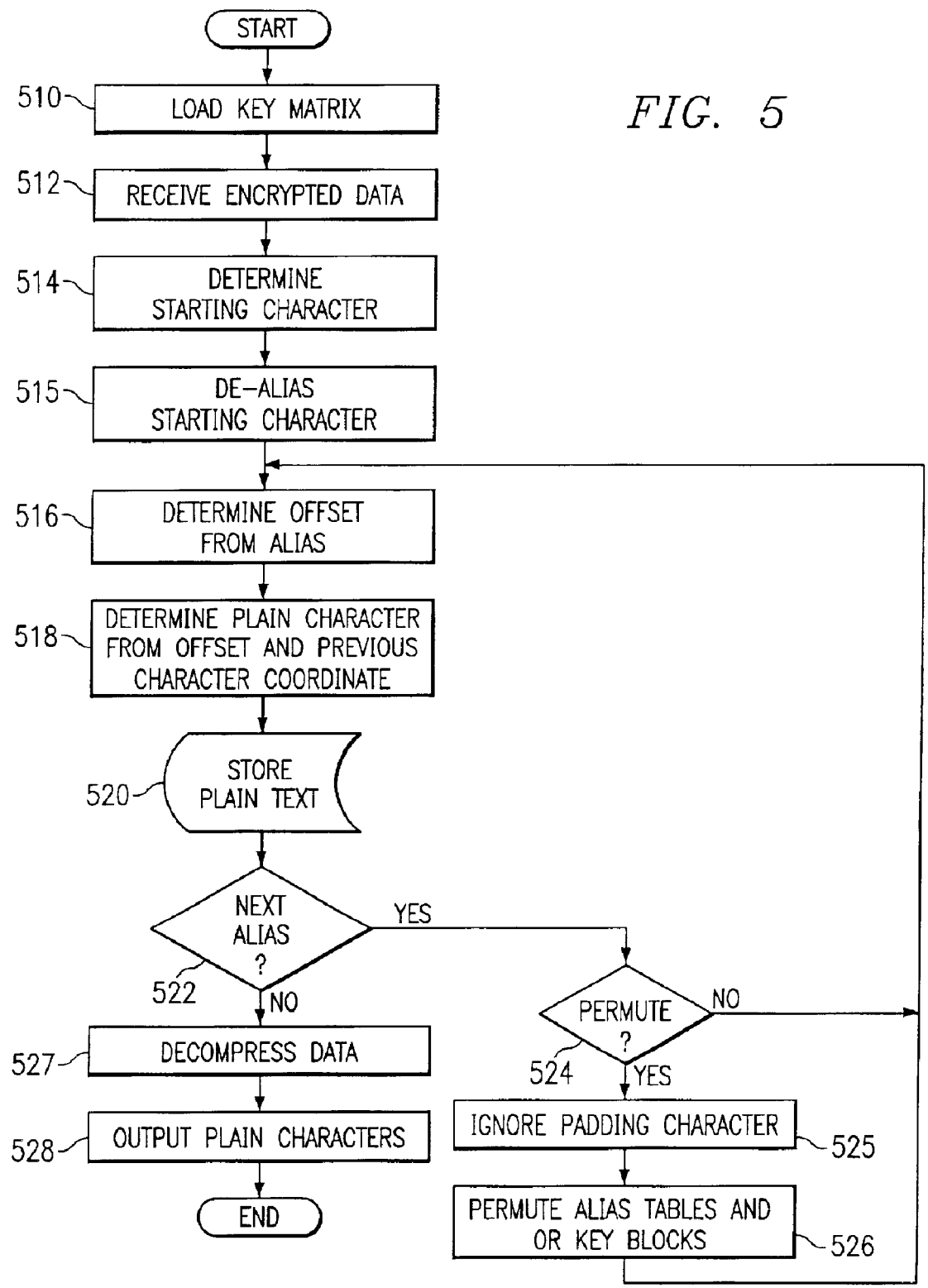
FIG. 5 is a flowchart of one embodiment of a method for decrypting data according to the present invention.

FIG. 5 is a flowchart illustrating one embodiment of a method for decrypting data encrypted by the method described in FIG. 4 using system 100 of FIG. 1. The method begins at step 510, where key matrix 121 is loaded into memory 112. At step 512, encryption manager 114 receives a message that includes encrypted data through input/output module 108. In the illustrated example, the input includes "L8RGs4b8T?Ak," the encrypted form of input "the" from the example illustrated in FIG. 4. The input includes aliases "L8R," "Gs4," "b8T," and "?Ak," representing the starting key coordinate, and the offsets for key characters "t," "h," and "e," respectively.

Processor 110 determines the starting key character $k_0$, for example, "%" 208 at coordinate (0,0,0), at step 514. If the message includes padding, processor 110 retrieves the size of the padding from padding table 174 to determine the starting key character located at the beginning of the encrypted data. Processor 110 uses starting alias table 172 to translate alias "L8R" into coordinate (0,0,0). Alternatively, starting key character $k_0$ may be encrypted and decrypted using other encryption techniques.

At step 516, an offset is determined from the alias. Alias module 140 uses de-alias tables 125a, 125b, and 125c respectively, to translate alias "Gs4" into offset <4,1,0>.

At step 518, a plain character is determined from this offset. Offset module 130 uses starting key character "%" 208 at coordinate (0,0,0) and offset <4,1,0> of key block 120 to determine plain character "t" 210a. Offset module 130 applies offset <4,1,0> to starting key character "%" 208 at coordinate (0,0,0) to arrive at coordinate (4,1,0) to determine the first plain character "t" 210a. The plain character is stored in memory 112 at step 520.

At step 522, the processor 110 determines whether there is a next alias. If there is a next alias, the method proceeds to step 524 to determine whether a permutation is to be performed. The encrypted data may include a permutation command that describe the permutation. If a permutation is to be performed, the method moves to step 526 to perform the permutation. Processor 110 may use permutation table 128 to determine how to perform the permutation. After performing the permutation, the method returns to step 516. If a permutation is not to be performed, the method returns to step 516.

At step 516, the offset is determined from the next alias. Alias module 140 uses de-alias tables 125a, 125b, and 125c respectively to translate alias "b8T" into offset <−3,3,1>. At step 518, the next plain character is determined from the offset. Offset module 130 determines from previous key character "t" at (4,1,0) and offset <−3,3,1> the plain character "h." Offset module 130 applies offset <−3,3,1> to the previous key character "t" at coordinate (4,1,0) to arrive at the coordinate (1,4,1) to determine the next plain character "h." The plain character is stored at step 520.

At step 522, the method determines whether there is a next alias. If there is a next alias, the method proceeds to step 524 to determine whether a permutation is to be performed. The encrypted data may include a permutation command that describe the permutation. If a permutation is to be performed, the method moves to step 526 to perform the permutation. Processor 110 may use permutation table 128 to determine how to perform the permutation. After performing the permutation, the method returns to step 516. If a permutation is not to be performed, the method returns to step 516.

At step 516, the offset is determined from the next alias. Alias module 140 uses de-alias tables 125a, 125b, and 125c respectively to translate alias "?Ak" into offset <2,0,1>. At step 518, the next plain character is determined from the offset. Offset module 130 determines from previous key character "h" at (1,4,1) and offset <2,0,1> the plain character "e." Offset module 130 applies offset <2,0,1> to the previous key character "h" at coordinate (1,4,1) to arrive at the coordinate (3,4,2) to determine the next plain character "e." The plain character is stored at step 520.

If there is no next alias at step 522, the method proceeds to step 528 to output the decrypted characters. In one embodiment, compression module 150 decompresses the decrypted data at step 528 if the data was compressed during encryption. The decrypted plain characters sequence "the" are outputted through input/output module 108. After outputting the plain characters, the method terminates.

The steps of the method may be performed in a different order. For example, the plain characters may be outputted as soon as they are determined from the offset.

Method of Creating Key Matrix

Figure 6:
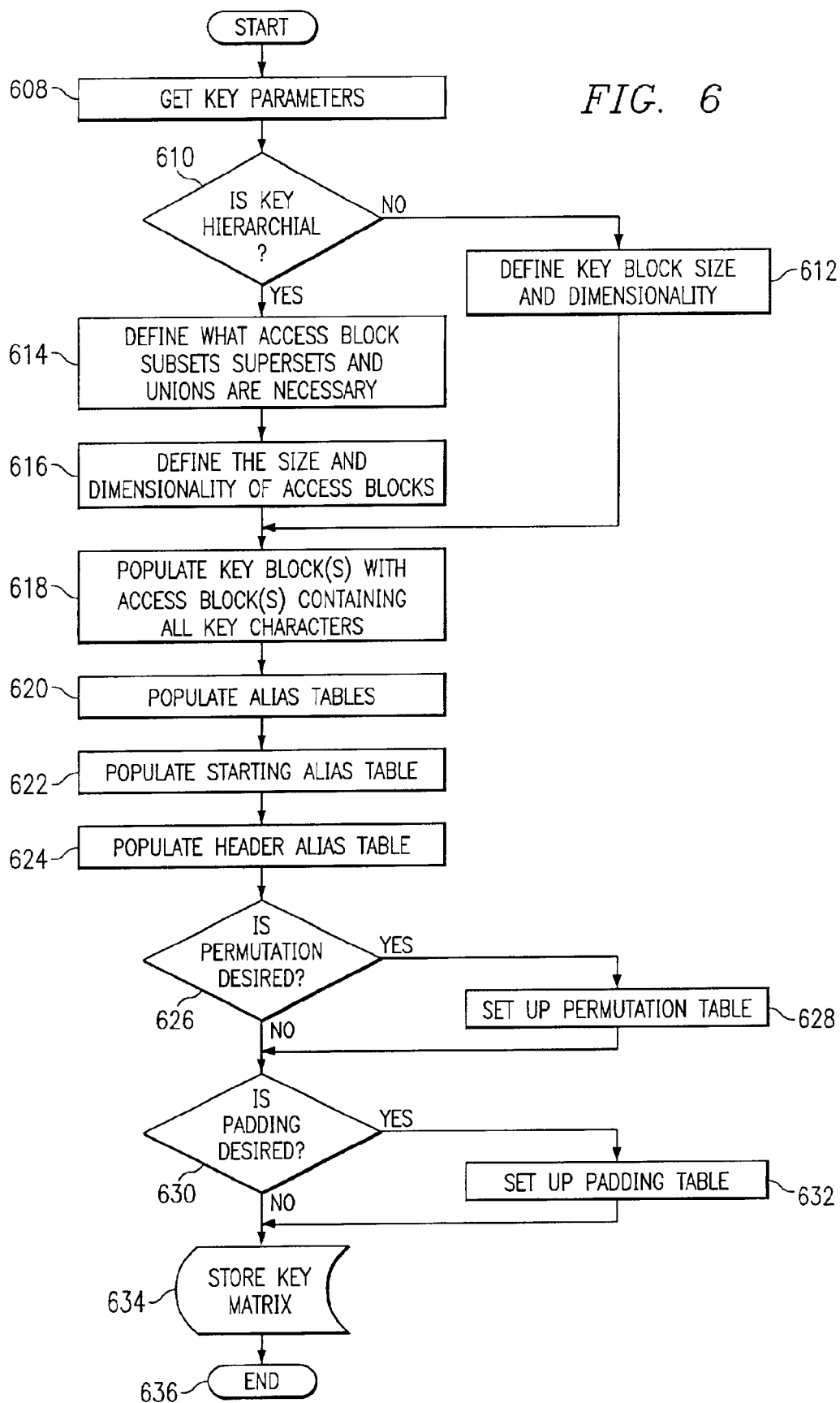
FIG. 6 is a flowchart of one embodiment of a method for generating a key matrix according to the present invention.

FIG. 6 is a flowchart illustrating one embodiment of a method for creating key matrix 121 of FIG. 1. Although key matrix 121 may have any suitable configuration, the illustrated key matrix 121 includes key block 120 of FIG. 2, alias tables 124 of FIG. 3A, starting alias tables 172 of FIG. 3B, and de-alias tables 138 of FIG. 3C.

The method begins at step 608, where a processor of key generator 160 receives key parameters from processor 110. Key parameters may include information describing the size and dimensions of key block 120 and access blocks 122 and whether or not key matrix 121 is to be hierarchical. Processor 110 may receive the key parameters as input from a user, or processor 110 may generate the key parameters in response to a user input.

The method continues with step 610 in which the key generator 160 makes a determination as to whether the key is to be hierarchical or not. If the key matrix 121 is determined to be hierarchical, the method proceeds to step 614 in which the process key generator 160 determines what access blocks are necessary for the key matrix.

Once the access blocks are determined, the process continues to step 616 in which the key generator 160 defines the size and dimensions of the individual access blocks. For instance, referring back to FIG. 1, key matrix 121, the access block 122a could be 16 units by 16 units by 16 units, and access block 122b could be 24 units by 24 units by 24 units making it a superset of access block 122a. Once all access blocks are created by step 614 the process moves to step 618.

If, at step 610, the key block is determined not to be hierarchical, the process proceeds to step 612 in which key block sizes and dimensions are determined. For example, a key block could be 16 units by 16 units by 16 units, or of a size determined by the user.

At step 618 the key block previously determined at steps 616 or 612 is randomly populated by key generator 160 with multiple occurrences of the 256 ASCII character set.

At step 620 the key generator 160 randomly populates the alias tables depending on the dimensionality of the access blocks. The key generator 160 creates at least one set of alias tables for each n-dimension of the key block. For example, a 3-dimensional key block (x,y,z) would have 3, or multiples of 3 alias tables. In FIG. 3A, x, y, and z alias tables are shown at 124a, 124b, and 124c. The alias tables contain columns for all 41 possible offset values −20 to 20, for example, and rows that define different alias sets "$a_0, a_1, a_2 \ldots$" In FIG. 3a, 124a, an offset of −3 in the x direction could be represented as "b," "!," or "6" depending on which row is selected. Rows within an alias table may selected sequentially or randomly. Each character only occurs once within an alias table. For example, in a key block that is 21 units on a side, the largest offset that is necessary to traverse the key block is 20 units on the positive direction and 20 units in the negative direction. To determine how many rows the table can contain, 256 is used, which is the maximum length of the ASCII character set, and divided by all possible offset values, in this example, 41. The result, which is 6, gives the number of rows the table can contain. As such, there could be 6 different ways to represent each possible offset without reusing a character. In this example, the y and z alias tables use the same characters as the x table, but in general, they stand for different offsets since they are randomly populated as described above.

At step 622, as in step 620, the key generator 160 randomly populates the starting alias tables depending on the dimensionality of the access block. The process creates at least one set of starting aliases for each dimension in the access block. Due to the limited amount of use, the starting alias tables, as shown in FIG. 3b, 172a, 172b, 172c may contain only one row and one way to represent a given offset. However, the starting alias tables could contain additional rows if the user chooses.

At step 624, as in step 620, the process randomly populates the header alias tables 170 depending on the dimensionality of the access block. The process creates at least one set of header alias tables for each dimension in the access block. Due to the limited amount of use, the header alias table may contain only a few rows and a few ways to represent a given offset.

At step 626, if permutation of the alias tables, or key blocks, or output values, is desired, a determination is made. If permutation is desired, the process moves to step 628 in which the permutation cycle and the tables affected is determined.

One method of permutation results from swapping the x, y, and z alias tables 124. For example, x could become y, y could become z, and z could become x. Another method of permutation could be the reordering of the output in the manner described above for the alias tables 124 so that by combining the two there are a total of 36 permutations. An additional method of permutation results from obtaining offsets from two or more key blocks. Any or all of these permutations may take place based on a cycle that is contained within the permutation table. This cycle could, for example, swap the alias tables after every 100 characters, swap key blocks every 150 characters, and swap the order of output values every 175 characters. The length of these cycles could be randomly determined and recorded every time a new key is created to enhance security. Alternately, the cycle lengths may be fixed or vary within each encrypted message, or cycle, within a message. Once the permutation process is established, the process moves to step 630. If permutation is not desired the process moves to step 630.

At step 630, if padding is desired, a determination is made. If padding is desired the process moves to step 632 in which the padding table 174 is defined as having padding and at what location the padding characters are inserted. Padding characters could be inserted before a message, within the body of a message, or after a message. The padding table defines how many padding characters are placed, and in what locations. For example, a padding table might direct the encryption module to place 100 randomly selected characters before the starting character and then one random character every hundred character within the message. Alternately, a permutation table may direct the encryption module to add 50 random characters at the beginning, and a random character later in the text. The position of the random character being defined as the ASCII value of the previous padding character. The position of a subsequent padding character could be determined by the ASCII value of the previous padding character. The padding characters may be random, or may serve to indicate that a change in permutation type or cycle length should occur. The procedure to be used is recorded within the padding table.

Once complete, the process moves to step 634. If no padding is desired, the process moves to step 634.

At step 634 the completed key is stored. Once stored, the process terminates.

Embodiments of the invention may provide numerous technical advantages. A technical advantage of one embodiment is that relative offsets between key characters that correspond to plain characters are used to encrypt a message. By using relative offsets, the encryption of a message results in a different output each time the message is encrypted, thus improving security without substantial use of processing power or time. Another technical advantage of one embodiment is that a different starting key character may be used to encrypt each message. Changing the starting key character results in different encrypted characters, even when the same message is encrypted multiple times.

Another technical advantage of one embodiment is that a key block has a header block for encrypting the header of a message and a separate text block for encrypting the body of a message. Accordingly, if an unauthorized user decrypts only the header of a message, the unauthorized user using that information cannot decrypt the body of the message.

Another technical advantage of one embodiment is that alias tables may be used. Aliases are used to obscure the meaning of offsets and reside in tables. Many aliases may be used to associate an alias with a given offset so that it is poly-alphabetical.

Another technical advantage of one embodiment is that multiple alias tables may be created so that a permutation of alias tables can take place according to a random and dynamic schedule. By permuting the alias tables at an unknown schedule, the collecting of data for frequency analysis of aliased offsets is not useful.

Another technical advantage of one embodiment is that a key block may have access blocks that allow for selective and even hierarchical access to encrypted data. Access blocks may include subsets of other access blocks, and may intersect with other access blocks. Another technical advantage of one embodiment is that data may be compressed prior to encryption to further obscure the text. Accordingly, embodiments of the present invention further provide for secure data encryption without substantial use of processing power or time.

Although an embodiment of the invention and its advantages are described in detail, a person skilled in the art could make various alterations, additions, and omissions without departing from the spirit and scope of the present invention as defined by the appended claims. For instance, the present invention can be embodied in hardware, software, or a combination thereof. Moreover, the dimensions of the blocks can vary, and aliases and permutations may be used.

While known approaches have provided improvements over prior approaches, the challenges to encrypt digital data continue to increase with demands for more and better techniques having greater effectiveness. Therefore, a need has arisen for a new method and system for data encryption.

What is claimed is:

1. A system for data encryption, the system comprising:
   an input operable to receive a plurality of plain characters;
   a memory operable to store a key block comprising a plurality of key characters, each plain character corresponding to a key character of the plurality of key characters;
   a processor coupled to the memory and to the input and operable to repeat the following for subsequent plain characters of the plurality of plain characters to encrypt the plain characters:
     locate a current key character corresponding to a current plain character; and
     locate a next key character corresponding to a next plain character;
   an offset module coupled to the processor and operable to repeat the following for subsequent plain characters of the plurality of plain characters to encrypt the plain characters:
     determine an offset between the current key character and the next key character; and
   an output coupled to the offset module and operable to provide encrypted characters.

2. The system of claim 1 wherein each of the key characters are associated with variables that denote the position of the key character within a coordinate space of the key block.

3. The system of claim 2 wherein the offset is a difference between the current key character's coordinate and the next key character's coordinate.

4. The system of claim 2 wherein the key characters are represented in at least n-dimensions.

5. The system of claim 4 wherein each of the key characters has a variable for each dimension of the coordinate.

6. The system of claim 5 wherein the variable is reordered according to a permutation command.

7. The system of claim 1 wherein the processor is operable to select one of the key characters as a starting key character.

8. The system of claim 7 wherein the processor is operable to reserve a starting alias table for the starting key character.

9. The system of claim 7 wherein the starting key denotes a variable determining when to insert padding.

10. The system of claim 7 wherein the processor is operable to select one of the key characters at random as the starting key character.

11. The system of claim 1 wherein the processor is operable to insert a predetermined character to signify an end of the data when there are no further plain characters.

12. The system as specified in claim 1 wherein the offset is integer based.

13. The system of claim 1 wherein the key characters are associated with geometric coordinates, and the offset is represented as a geometric coordinate offset.

14. The system of claim 1 wherein the offset comprises a direction and a distance.

15. The system of claim 1 wherein the offset comprises a geometric coordinate difference.

16. The system of claim 1 wherein at least two of the key characters correspond to one of the plain characters.

17. The system of claim 2 wherein the processor is operable to map the coordinates of each key character into a look-up table comprising of elements.

18. The system of claim 17 wherein every key character maps directly to one element in the look-up table.

19. The system of claim 17 wherein the length of the look-up table is a function of the number of unique elements within the key block, and the number of rows is a function of the number of common elements.

20. The system of claim 19 wherein the number of elements is 256.

21. The system of claim 17 wherein the key block has dimensions, wherein each element of the look-up table holds a variable for each dimension of the key block.

22. The system of claim 2 wherein the processor is operable to map the coordinates of each key character into arrays.

23. The system of claim 22 wherein every key character maps directly to an element in one of the arrays.

24. The system of claim 22 wherein each array has a length determined by the number of unique elements within the key block, and the number of arrays is determined by the number of common elements in the key block.

25. The system of claim 22 wherein the key block has dimensions, and wherein each element of the arrays holds a variable for each dimension of the key block.

26. The system of claim 22 wherein the array length is 256.

27. The system of claim 1 wherein the processor is operable to associate an alias with the offset.

28. The system of claim 27 wherein an alias module is operable to permute the aliases.

29. The system of claim 28 wherein the aliases reside in an alias table, wherein the processor is operable to permute the alias tables.

30. The system of claim 27 wherein a starting alias is associated with a starting key character.

31. The system of claim 30 wherein the subsequent aliases represent offsets relative to the previous key character.

32. The system of claim 27 wherein the aliases have at least n-variables.

33. The system of claim 32 wherein each of the aliases corresponds to an offset.

34. The system of claim 1 wherein the processor is operable to:
define a set of aliases corresponding to the offset; and
associate an alias of the set of aliases with the offset.

35. The system of claim 34, wherein the processor is operable to randomly select one of the aliases from the set of aliases to represent a parameter of the offset.

36. The system of claim 1 further comprising an alias table associating an alias with the offset.

37. The system of claim 36 wherein the key block has n-dimensions, wherein the processor is operable to define one or more alias tables for each dimension of the key block.

38. The system of claim 37 wherein the processor is operable to define a plurality of alias tables for each dimension.

39. The system of claim 38 wherein the processor is operable to permute the alias tables within a dimensional set.

40. The system of claim 1 wherein the key block comprises a plurality of blocks.

41. The system of claim 1 wherein the key block comprises a plurality of access blocks.

42. The system of claim 1 wherein there are a plurality of key blocks.

43. The system of claim 42 wherein the processor is operable to permute the key blocks.

44. The system of claim 1 wherein the key block comprises multiple access blocks to provide multiple hierarchical capabilities.

45. The system of claim 44 wherein:
the first access block is accessible by a first user; and
the second access block is accessible by a second user being different than the first user.

46. The system of claim 44 wherein the first access block comprises the second access block.

47. The system of claim 46 wherein a user has access rights to any hierarchical access block that resides within the user's larger hierarchical access block.

48. The system of claim 46 wherein a user does not have access rights to any access block that is a container for the access block to which the user has rights.

49. The system of claim 44 wherein part of the first access block comprises part of the second access block.

50. The system of claim 1 wherein the key block comprises a header block.

51. The system of claim 1 wherein the key block has an axis wrapping around the key block.

52. The system of claim 1 wherein the data has a header and a body, wherein the processor is operable to encrypt the header with a first set of the key characters and encrypt the body with a second set of the key characters, the first set being arranged differently from the second set of key characters.

53. The system of claim 1 wherein the processor is operable to insert padding before, during or after the encrypted plain characters.

54. The system of claim 1 wherein the processor is operable to associate an alias with a parameter of the offset.

55. The system of claim 1 wherein the processor is operable to compress the plain characters prior to the encryption steps of claim 1.

* * * * *